Patented July 7, 1925.

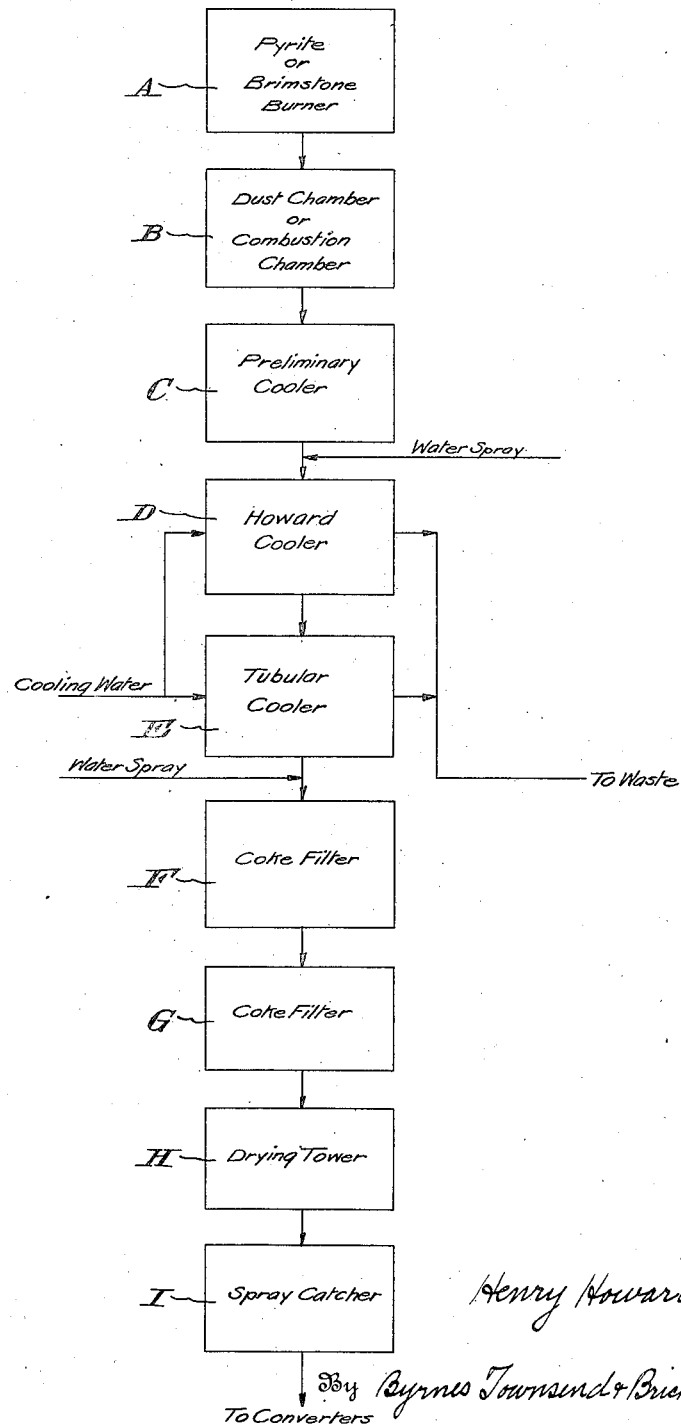

1,545,142

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

MANUFACTURE OF SULPHURIC ACID BY THE CONTACT PROCESS.

Application filed June 2, 1924. Serial No. 717,407.

*To all whom it may concern:*

Be it known that I, HENRY HOWARD, a citizen of the United States, residing at Cleveland, in the county of Cuyahoga and State of Ohio, have invented certain new and useful Improvements in the Manufacture of Sulphuric Acid by the Contact Process, of which the following is a specification.

In the process at present commonly used for the manufacture of sulphuric acid by the contact process hot burner gases containing sulphuric dioxid produced by burning sulphurous material such as brimstone or pyrite are prepared for treatment in the converters by being cooled, filtered, dried and then reheated to a suitable temperature for entry into the converters. For cooling the gases it is customary to use a so-called wet cooler, that is, a scrubbing tower in which the hot gases are contacted with cool and relatively dilute sulphuric acid, and for filtering the cooled gases coke filters usually are employed. In case the gases have been cooled by means of a wet cooler, the impure acid separated therefrom by the filters ordinarily amounts to from 3 to 5% of the theoretical yield of sulphuric acid calculated on the quantity of sulphur burned.

The drying of the filtered gases is carried out by contacting them with relatively concentrated sulphuric acid in one or more scrubbing towers. The drying of the gases which have been cooled by scrubbing with dilute acid and filtered as described, requires in the neighborhood of 550 pounds of 66° Bé. sulphuric acid per ton of sulphur burned. This acid used for drying the gases, as well as the impure acid separated by the filters, represent very substantial losses in the process. If it is attempted to avoid the use of drying acid in the process by cooling the hot burner gases in dry coolers, another difficulty is encountered in that the gases may, under some circumstances, be so dry that the concentration of the impure acid collected in the filters will be as high as 45° Bé. which is too high for operating purposes. I have now found that by dry-cooling the burner gases and then conditioning them with respect to their moisture content to a point intermediate the saturation point and the point at which impure acid of a concentration of 45° Bé. is produced and then filtering them and thereafter drying them to a point suitable for conversion, the yield of impure acid and the drying acid requirements may be very materially reduced and at the same time the separation of impure acid of to high a concentration in the coke filters is avoided.

For convenience in describing my invention reference is made to the accompanying drawings in which the single figure is a flow sheet of a contact sulphuric acid plant with the converters and subsequent parts omitted.

Referring to the drawing A represents a burner for brimstone or pyrites or other sulphur containing material and B represents either a dust chamber in case pyrite is burned or a combustion chamber in case brimstone is burned. C represents a preliminary cooler which preferably is a system of air cooled pipes or conduits and is of course of the dry cooler type. The Howard cooler marked D constitutes the subject matter of my copending application Serial No. 594,112, filed October 12, 1922. This cooler also is of the so-called dry cooler type and comprises a relatively large open chamber having water cooled side walls. E represents a tubular cooler, that is, a cooler formed of pipes or conduits which are submerged in a water bath or kept wet by water sprays. This cooler E also is of the dry-cooler type. F and G represent coke filters, H represents one or more drying towers, and I represents a spray catcher, all of the usual type.

In carrying out the process in accordance with my invention the hot burner gases leaving the dust chamber or combustion chamber as the case may be at a relatively high temperature, say 1400° F., pass to the preliminary cooler C in which their temperature is reduced to about 800° F., then into the cooler D where their temperature is reduced to say 300° F. and then into the tubular cooler E in which the temperature is reduced to say 100° F. At some point in the flow of the gases following their passage through the preliminary cooler C and before their passage through the coke filters F and G, they are conditioned with respect to their moisture content. This may be accomplished by the introduction of a water spray or steam into the gases or by bringing the gases into contact with water or in any other suitable way, at one or more points in their path between the preliminary cooler C and the coke filter F. On the accompanying flow sheet the introduction of a water spray at the entrances to the cooler D and the coke filter F is indicated. The introduction of at least a part of the required amount of water at the entrance to the cooler D serves to dilute the acid which collects in the flues directly following it and thus to prevent their corrosion. Introduction of moisture into the coke filter F has been found to give the most uniform and satisfactory results. The gases are then passed through the coke filters F and G and then dried and heated for delivery to the converters. The purpose of the preliminary dry cooling of the gases is to reduce the temperature of the relatively dry hot burner gases to a temperature below which a relatively high moisture content will not result in the formation of sulphuric acid. In this way the excessive production of impure acid, as is the case when a wet cooler is employed, is avoided. After the gases have been preliminarily or preferably wholly cooled they are moistened or conditioned with respect to their moisture content to a proper degree for filtering. In conditioning the gases with respect to their moisture content two factors must be taken into consideration. The moisture content of the gases should be made as small as is possible in order to minimize the drying acid requirements and on the other hand the gases must contain sufficient moisture so that the concentration of the impure acid collected in the filters will not be excessive. As is stated above, the limits of the moisture content of the gases entering the filters are from saturation on the one hand to a moisture content capable of producing impure acid of 45° Bé on the other hand. In practice I have found that the moisture content should be sufficiently high to give impure acid of not more than 30° Bé and preferably between 20 and 25° Bé. The coolers D and E serve to reduce the temperature of the gases delivered from the preliminary cooler C to a temperature suitable for filtering, say under 100° F. The gases after being cooled in a dry state and then conditioned with respect to their moisture content are filtered in the usual way, preferably through a plurality of coke filters. The quantity of impure acid separated from the gases is practically negligible amounting to only about 0.3 to 0.6% of the total theoretical yield, this result being attributed to the cooling and conditioning of the gases in the manner described. The gases are next dried in the usual way by means of drying towers through which strong sulphuric acid is circulated. However, due to the relative absence of moisture in the gases during the cooling step as compared with moistening which takes place when the hot gases are subjected to wet cooling as in the prior process referred to, the cooling is much more easily and completely accomplished, thereby reducing the drying acid requirements from about 550 pounds of 66° Bé acid per ton of sulphur burned in a plant using the said prior process to about 175 pounds of 66° Bé acid per ton of sulphur burned in my process. The gases leaving the drier H pass through the spray catcher I, the construction and operation of which are well known, and then to the converters and subsequent parts of the contact sulphuric acid plant which form no part of the present invention.

The drying of the gases of course is for the purpose not only of reducing the moisture content thereof to the most desirable point for the converting step, but also to prevent the premature formation of $H_2SO_4$ in the iron apparatus which would result in its corrosion.

My process therefore is a compromise between two extremes, that is, between wet cooling of the burner gases followed by filtration and the incidental production of relatively large amounts of impure acid and then the drying of the gases using relatively large quantities of drying acid on the one hand, and the dry cooling of the burner gases followed directly by filtration with the separation of impure acid of too high a concentration for satisfactory operation with coke filters and then humidifying the filtered gases for the purpose of establishing a proper moisture content for the converting step on the other hand.

In the foregoing description I have described a preferred form and arrangement of apparatus and a preferred procedure to be followed in carrying out my invention. It is to be understood however that the practice of the invention is not limited to the use of the particular apparatus or to the precise procedure described.

Regarding the apparatus, it is of course essential that the coolers be of the dry type, but aside from this limitation the coolers may be of any suitable form. For instance, a single continuous cooler may take the place of the coolers C, D and E. Or each of the coolers C, D and E or any two of them may be replaced by other forms of coolers. For instance, the Howard cooler D may be replaced by the type of cooler disclosed in the United States patent to Eschellmann and Harmuth, No. 1,078,841.

I claim:—

1. In a process of making sulphuric acid the steps comprising, cooling hot burner gases out of contact with water, moistening the cooled gases and thereafter successively filtering and drying the gases.

2. In a process of making sulphuric acid the steps comprising, cooling hot burner gases out of contact with water, and moistening the cooled gases to a point intermediate saturation thereof and a point at which acid of a concentration of 45° Bé. may be separated therefrom.

3. In a process of making sulphuric acid the steps comprising, cooling hot burner gases out of contact with water and moistening the cooled gases to a point intermediate saturation thereof and a point at which acid separated therefrom has a concentration not greater than 30° Bé.

4. In a process of making sulphuric acid the steps comprising, cooling hot burner gases out of contact with water, and moistening the cooled gases to a point at which acid separated therefrom has a concentration of about 20–25° Bé.

5. In the contact process for the manufacture of sulphuric acid the steps which consist in cooling hot burner gases out of contact with water, conditioning the cooled gases with respect to their moisture content to a point intermediate saturation and a humidity at which acid of 45° Bé may be separated therefrom, filtering the cooled and conditioned gases, drying the filtered gases to a humidity suitable for conversion and heating the dried gases to a temperature suitable for their introduction into the converter.

In testimony whereof, I affix my signature.

HENRY HOWARD.